US012377560B1

(12) United States Patent
Hu

(10) Patent No.: US 12,377,560 B1
(45) Date of Patent: Aug. 5, 2025

(54) ELECTRIC HAIR CLIPPER

(71) Applicant: Shenzhen Jiechuangteng Technology Co., Ltd., Shenzhen (CN)

(72) Inventor: Jinxiang Hu, Shenzhen (CN)

(73) Assignee: Shenzhen Jiechuangteng Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/007,622

(22) Filed: Jan. 2, 2025

(51) Int. Cl.
*B26B 19/38* (2006.01)
*B26B 19/06* (2006.01)

(52) U.S. Cl.
CPC ...... *B26B 19/3853* (2013.01); *B26B 19/3873* (2013.01); *B26B 19/06* (2013.01)

(58) Field of Classification Search
None
See application file for complete search history.

(56) References Cited

U.S. PATENT DOCUMENTS

2023/0256632 A1* 8/2023 Walker .................. B26B 19/205 30/201
2024/0416539 A1* 12/2024 Takano ................... B26B 19/28

FOREIGN PATENT DOCUMENTS

CN 119635727 A * 3/2025
EP 4279231 A1 * 11/2023 ......... B26B 19/3853
JP H0162770 U * 4/1989
JP H08229254 A * 9/1996

OTHER PUBLICATIONS

English translation of JP-H08229254-A, dated Sep. 10, 1996.*
English translation of JP-H0162770-U, dated Apr. 21, 1989.*
English translation of CN-119635727-A, dated Mar. 18, 2025.*

* cited by examiner

*Primary Examiner* — Hwei-Siu C Payer
(74) *Attorney, Agent, or Firm* — Jose Cherson Weissbrot

(57) ABSTRACT

The disclosure provides an electric hair clipper, including: a housing provided with an inner cavity; a motor disposed in the inner cavity; and a pattern layer disposed on the motor, where the housing is provided with an observation portion that is configured for a user to visually observe the pattern layer from outside the housing.

18 Claims, 14 Drawing Sheets

ELECTRIC HAIR CLIPPER

TECHNICAL FIELD

The disclosure relates to the technical field of hair clippers, and in particular, to an electric hair clipper.

BACKGROUND ART

An electric hair clipper has two stacked rows of teeth with blades, where one of the rows fixed relative to a housing is a static blade, and the other row slidable relative to the static blade is a moving blade. When the electric hair clipper is turned on, the static blade is in a stationary state, the moving blade is driven by a motor to realize a rapid reciprocating motion, causing the blades to move in a staggered manner so as to cut hair between the moving blade and the static blade, thereby achieving the purpose of haircutting.

SUMMARY

Embodiments of the disclosure provide an electric hair clipper, so as to solve problems in the related art. Technical solutions are as follows:

The embodiments of the disclosure provide an electric hair clipper, including:

a housing provided with an inner cavity;

an outer rotor motor disposed in the inner cavity; and a pattern layer that is disposed on an outer rotor of the outer rotor motor, and is rotatable with the outer rotor, where the housing is provided with an observation portion that is configured for a user to visually observe the pattern layer from outside the housing.

The above description is merely presented for the purpose of the description, and is not intended to limit the disclosure in any way. Except for the above illustrative aspects, implementations and features, further aspects, implementations and features of the disclosure will become readily apparent with reference to the drawings and the following detailed description.

BRIEF DESCRIPTION OF THE DRAWINGS

In the drawings, the same reference signs denote the same or similar components or elements throughout multiple drawings unless otherwise specified. These drawings are not necessarily drawn to scale. It should be understood that these drawings depict only some implementations according to the disclosure and are not to be construed as limiting the scope of the disclosure.

DETAILED DESCRIPTION OF EMBODIMENTS

Figure 1:
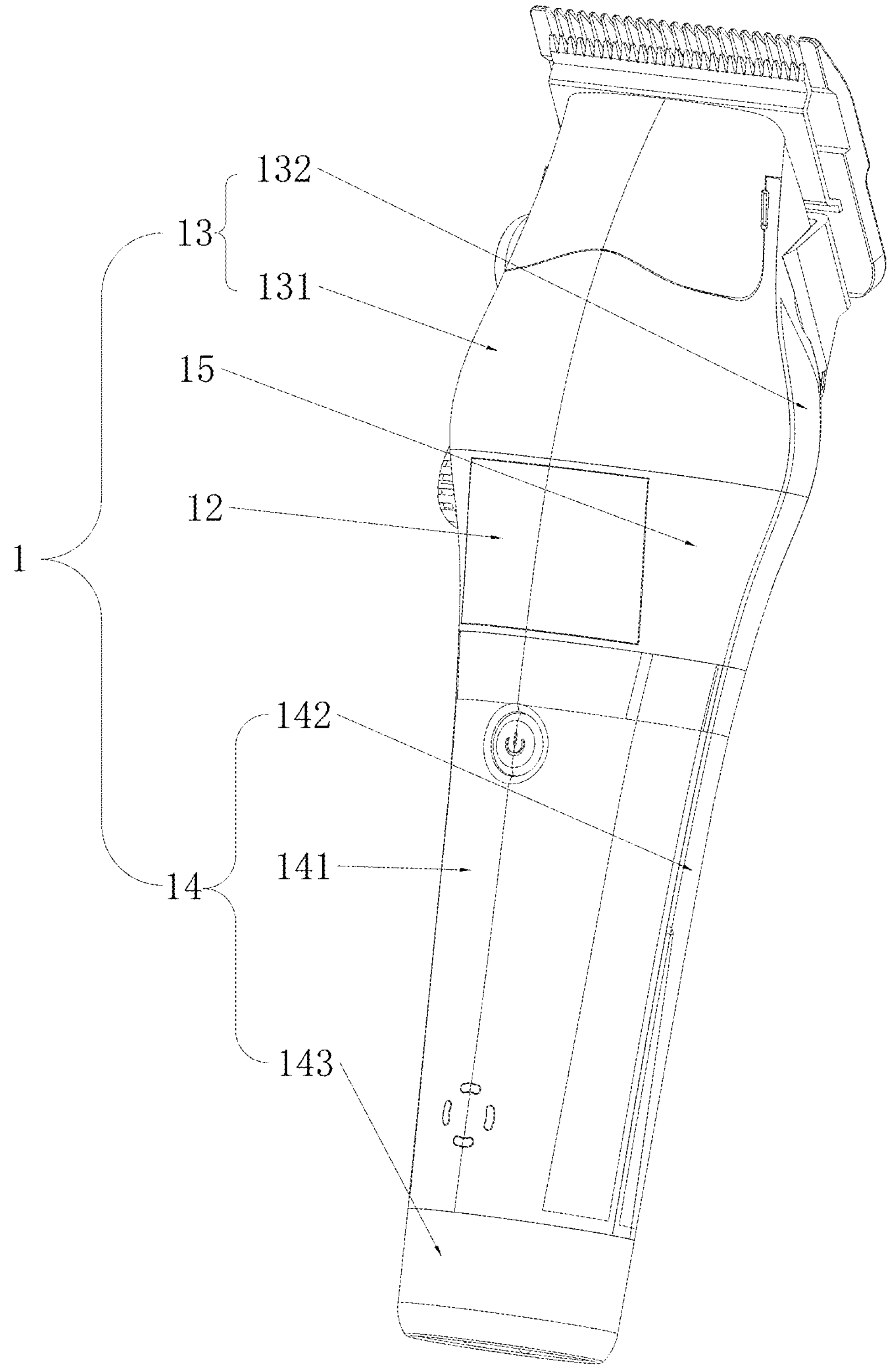
FIG. 1 is a perspective schematic structural diagram of an electric hair clipper according to a first implementation of the disclosure.

Only some exemplary embodiments are briefly described below. As can be appreciated by those skilled in the art, modifications may be made to the described embodiments in various ways without departing from the spirit or scope of the disclosure. Therefore, the drawings and the description are considered as exemplary in nature rather than limiting.

FIGS. 1-14 show an electric hair clipper of a preferred implementation of the disclosure. The electric hair clipper includes:

a housing 1 provided with an inner cavity 11;

an outer rotor motor 2 disposed in the inner cavity 11; and a pattern layer 3 that is disposed on an outer rotor 22 of the outer rotor motor 2 and is rotatable with the outer rotor 22, that is, when the outer rotor motor 2 operates, the pattern layer 3 also rotates with the outer rotor 22, such that a dynamic pattern effect can be formed, where the housing 1 is provided with an observation portion 12 that is configured for a user to visually observe the pattern layer 3 from outside the housing 1.

In the electric hair clipper of the disclosure, by providing the pattern layer 3 on the outer rotor 22 of the outer rotor motor 2 and providing the observation portion 12 on the housing 1, the observation portion 12 can be utilized to allow the user to visually observe the static or dynamic pattern layer 3 from outside the housing 1, so as to allow the user to visually enjoy the external form and aesthetic characteristics of the pattern layer 3, such that the electric hair clipper has a viewing function in addition to a haircutting function, is more diversified in function, and can meet different use requirements of the user, and at the same time, it also increases the interest; furthermore, the outer rotor motor 2 is small in axial dimension, such that an occupied space can be reduced, a miniaturization design of the electric hair clipper is better facilitated, and the outer rotor motor can rapidly run after being turned on, causing the electric hair clipper to be low in power consumption, high in rotary speed, efficient, and long in service life; and furthermore, the pattern layer 3 can be conveniently printed or adhered on the outer rotor 22 because the outer rotor 22 is located outside the outer rotor motor 2.

In an implementation, the pattern layer 3 is provided around an axial center line of the outer rotor 22, making the pattern layer 3 large enough for the user to view visually.

In an implementation, the pattern layer 3 is printed on an outer surface of the outer rotor motor 2, and the printed pattern layer 3 is bright in color, high in reproduction degree, and strong in durability. Alternatively, the pattern layer 3 is adhered on the outer surface of the outer rotor motor 2, such that the pattern layer 3 can be removed from the outer rotor motor 2, making it convenient to replace different pattern layers 3.

In an implementation, the observation portion 12 is made of a transparent material, for example, the observation portion 12 may specifically be of a glass structure or a plastic structure.

In order to reduce the processing difficulty of the housing 1 and facilitate its mounting, referring to FIGS. 1-5, in an implementation, the housing 1 includes:

a front housing 13 made of a non-transparent material;

a rear housing 14 made of a non-transparent material; and a middle housing 15 sandwiched between the front housing 13 and the rear housing 14, where the inner cavity 11 is enclosed by the middle housing 15, the front housing 13 and the rear housing 14, the middle housing 15 is disposed around the outer rotor 22 and provided with a view window 151 that is covered by the observation portion 12, and the middle housing 15 is made of a non-transparent material.

Referring to FIGS. 1-5, for ease of mounting, in an implementation, the front housing 13 includes:

an upper front housing 131; and a lower front housing 132, where one of the lower front housing 132 and the upper front housing 131 is provided with a first snap-in groove 1321, the other one of the lower front housing 132 and the upper front housing 131 is provided with a first snap-in protrusion 1311, and the first snap-in protrusion 1311 is mated with the first snap-in groove 1321 to connect the lower front housing 132 and the upper front housing 131 together, such that the lower front housing 132 and the upper front housing 131 can be mounted without tools, the mounting operation is simpler and more convenient, and the mounting efficiency can be improved; and the rear housing 14 includes:

an upper rear housing 141;

a lower rear housing 142, where one of the lower rear housing 142 and the upper rear housing 141 is provided with a second snap-in groove 1421, the other one of the lower rear housing 142 and the upper rear housing 141 is provided with a second snap-in protrusion 1411, and the second snap-in protrusion 1411 is mated with the second snap-in groove 1421 to connect the lower rear housing 142 and the upper rear housing 141 together, such that the lower rear housing 142 and the upper rear housing 141 can be mounted without tools, the mounting operation is simpler and more convenient, and the mounting efficiency can be improved; and an end cover 143 covering rear end openings of both the upper rear housing 141 and the lower rear housing 142, where the end cover 143 is provided with a third snap-in groove 1431, at least one of the upper rear housing 141 and the lower rear housing 142 is provided with a third snap-in protrusion 1412, and the third snap-in protrusion 1412 is mated with the third snap-in groove 1431, such that the end cover 143, the upper rear housing 141 and the lower rear housing 142 can be mounted without tools, and the mounting operation is simpler and more convenient.

Figure 5:
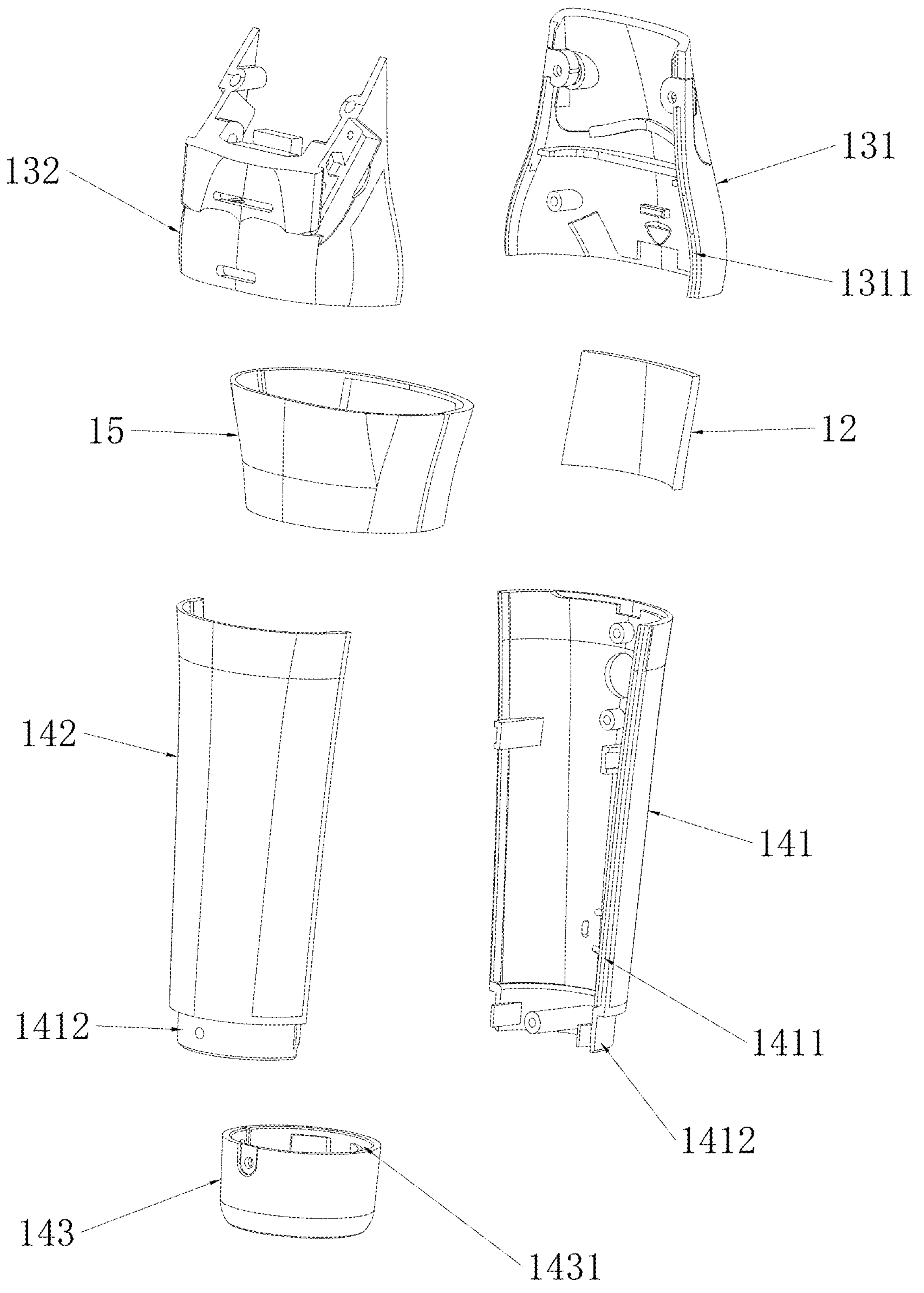
FIG. 5 is an exploded view of the housing in the electric hair clipper shown in FIG. 1 from a second perspective.
Figure 6:
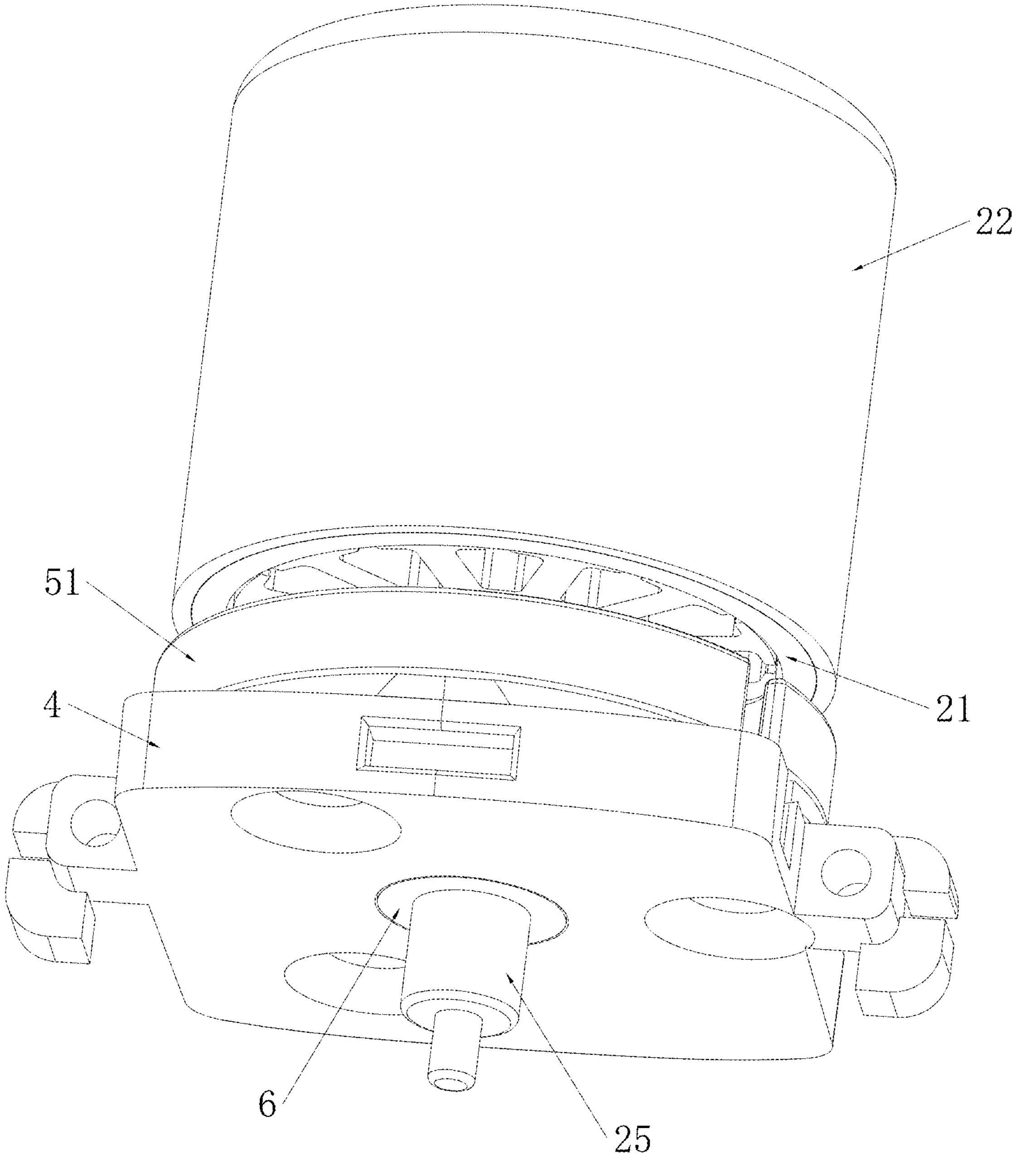
FIG. 6 is a perspective schematic diagram of a motor, a fixation frame, and a shock-absorbing body that are assembled together according to the disclosure.

Referring to FIG. 5, in an implementation, the upper rear housing 141 and the lower rear housing 142 both are provided with the third snap-in protrusions 1412, and each of the third snap-in protrusions 1412 is inserted into a corresponding third snap-in groove 1431, so as to reliably connect the end cover 143 and the upper rear housing 141 as well as the end cover 143 and the lower rear housing 142 together.

In an implementation, the end cover 143, the upper rear housing 141 and the lower rear housing 142 are also connected together via a second fastener (not shown) to improve the connection stability of the end cover 143, the upper rear housing 141 and the lower rear housing 142, thereby ensuring that the end cover 143, the upper rear housing 141 and the lower rear housing 142 are reliably fixed together.

Figure 8:
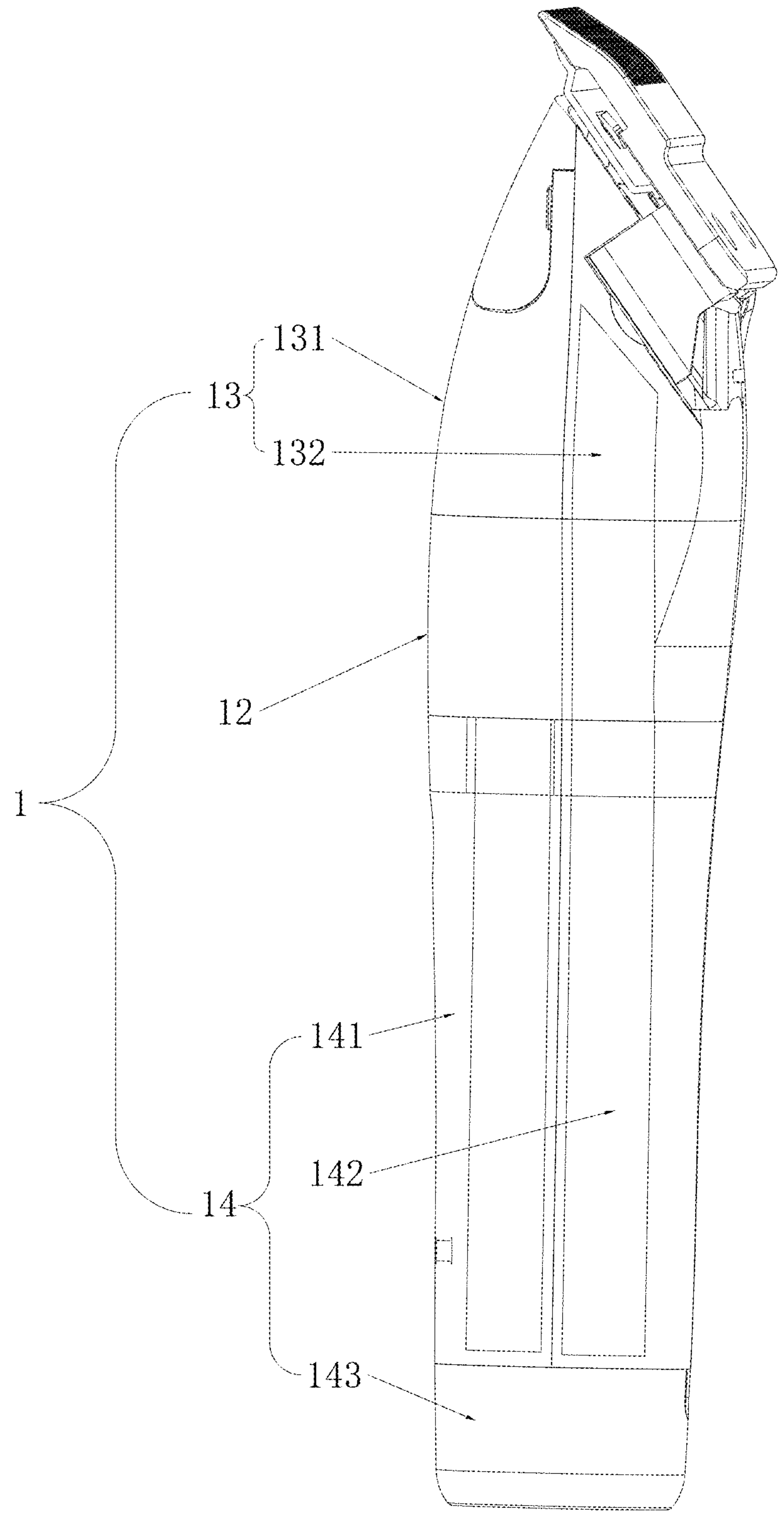
FIG. 8 is a perspective schematic structural diagram of an electric hair clipper according to a second implementation of the disclosure.
Figure 9:
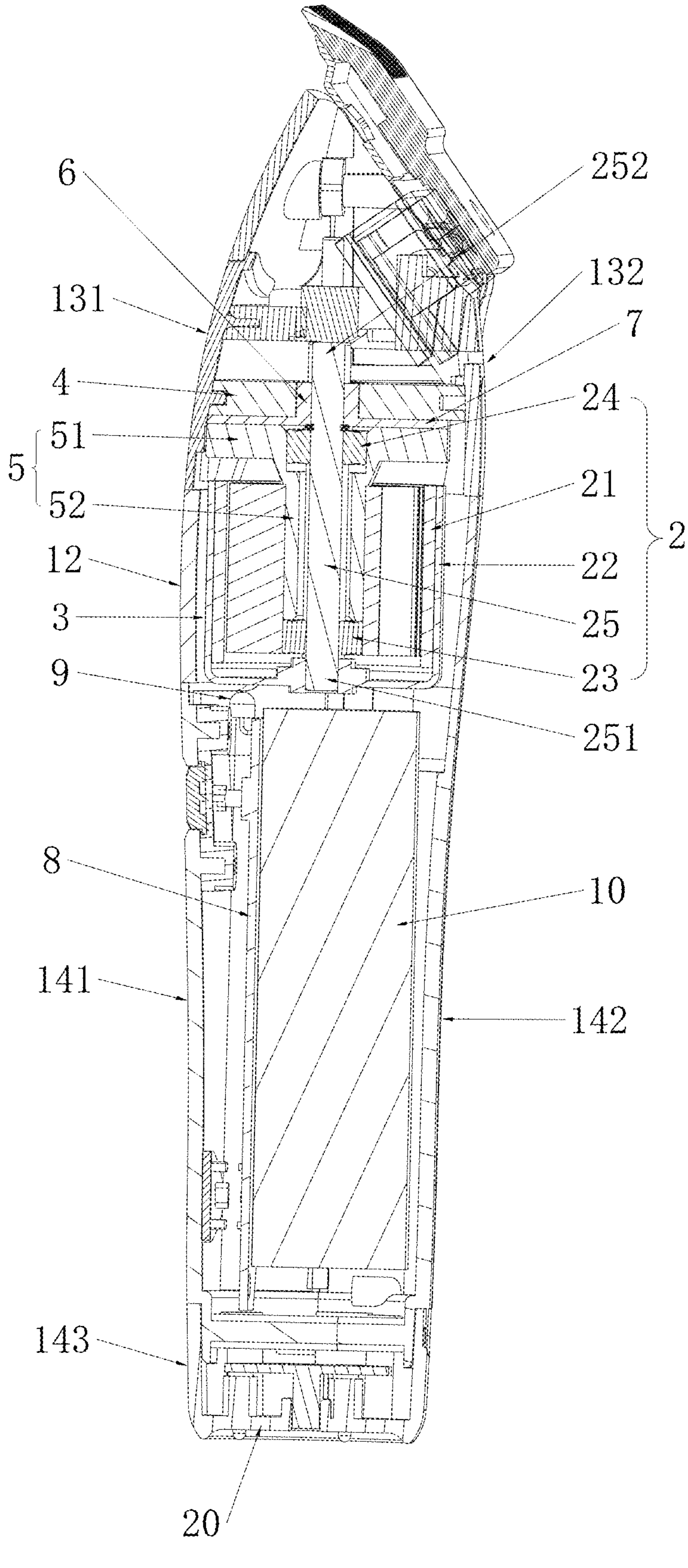
FIG. 9 is a cross-sectional view of the electric hair clipper shown in FIG. 8.
Figure 10:
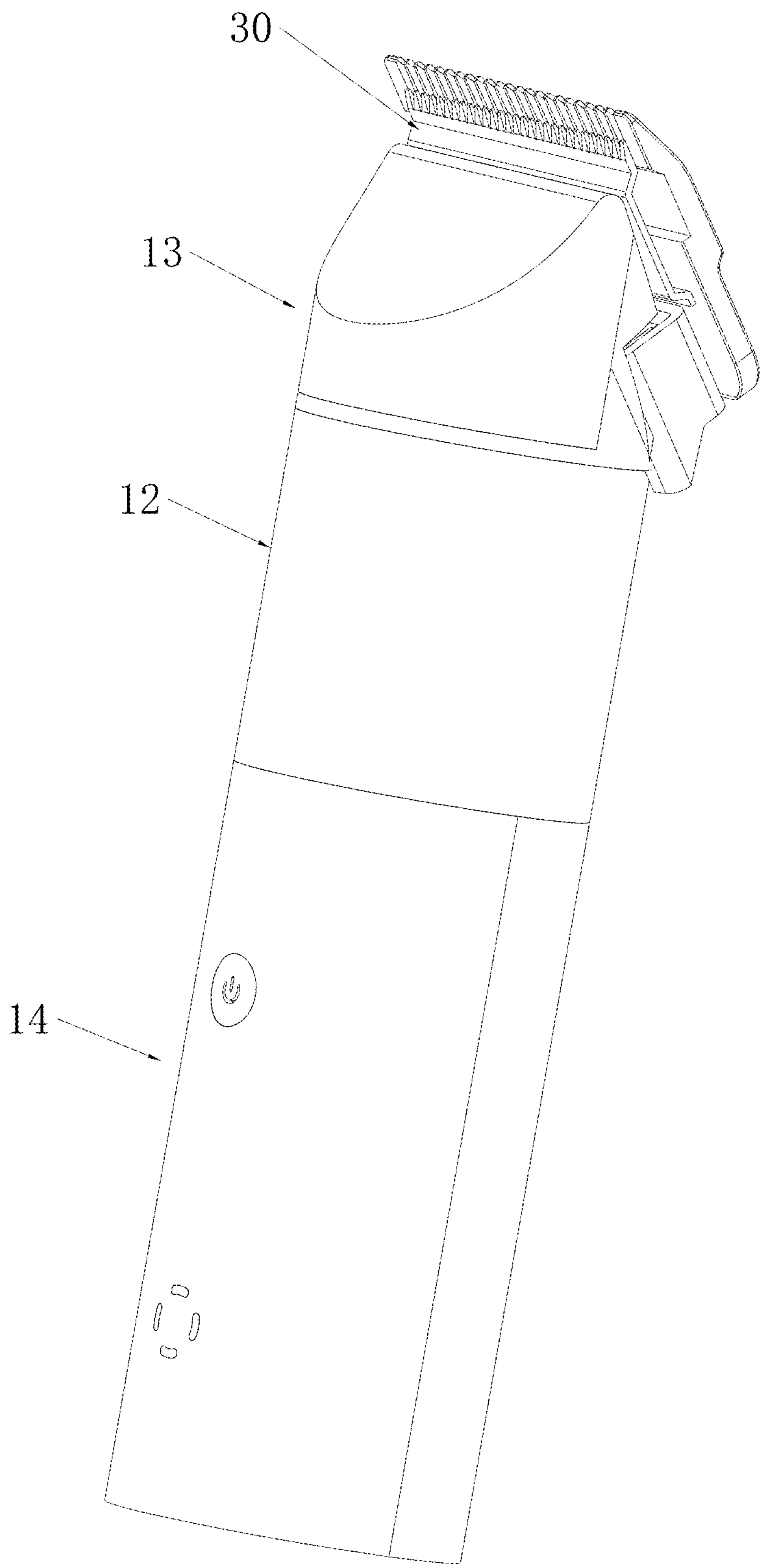
FIG. 10 is a perspective schematic structural diagram of an electric hair clipper according to a third implementation of the disclosure.
Figure 11:
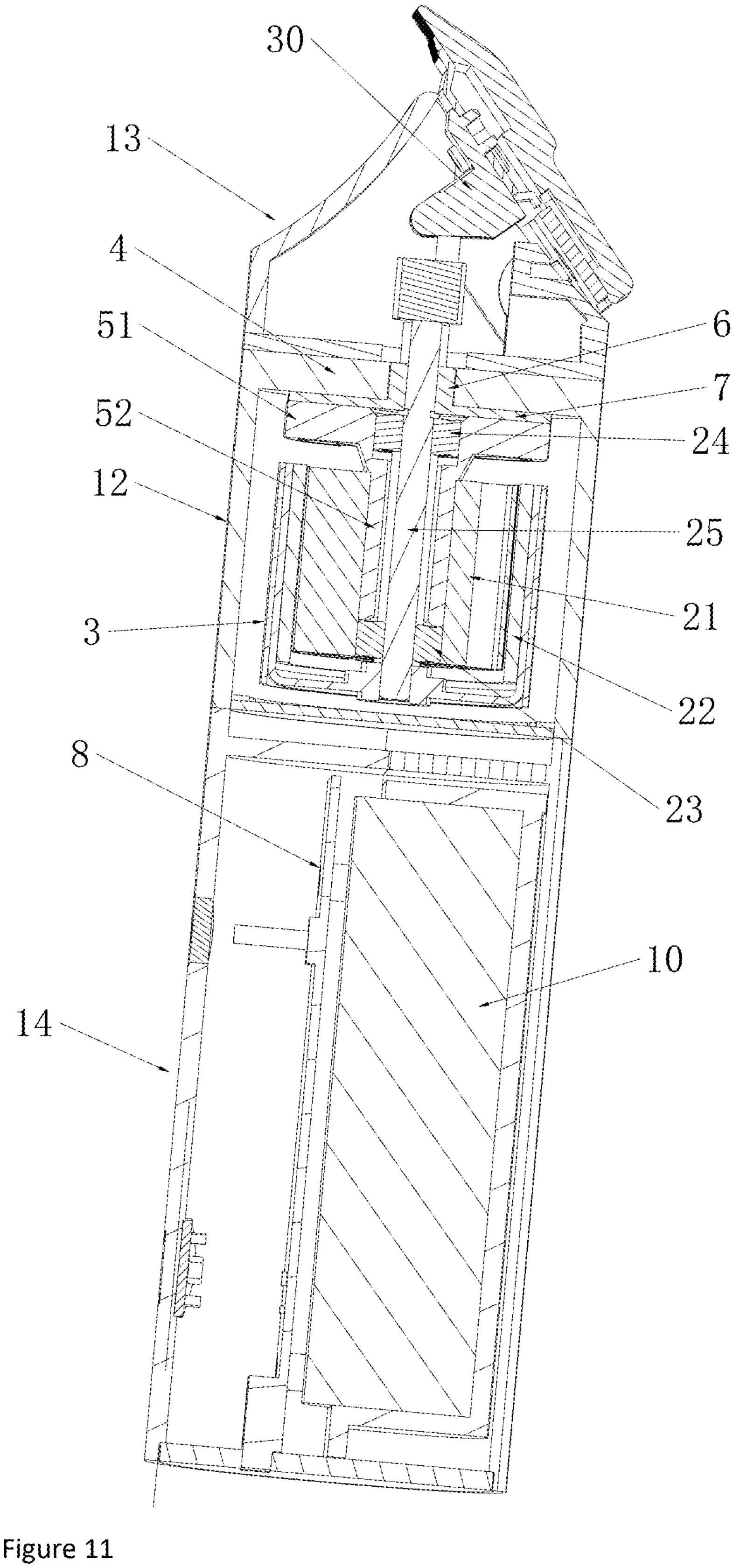
FIG. 11 is a cross-sectional view of the electric hair clipper shown in FIG. 10.
Figure 12:
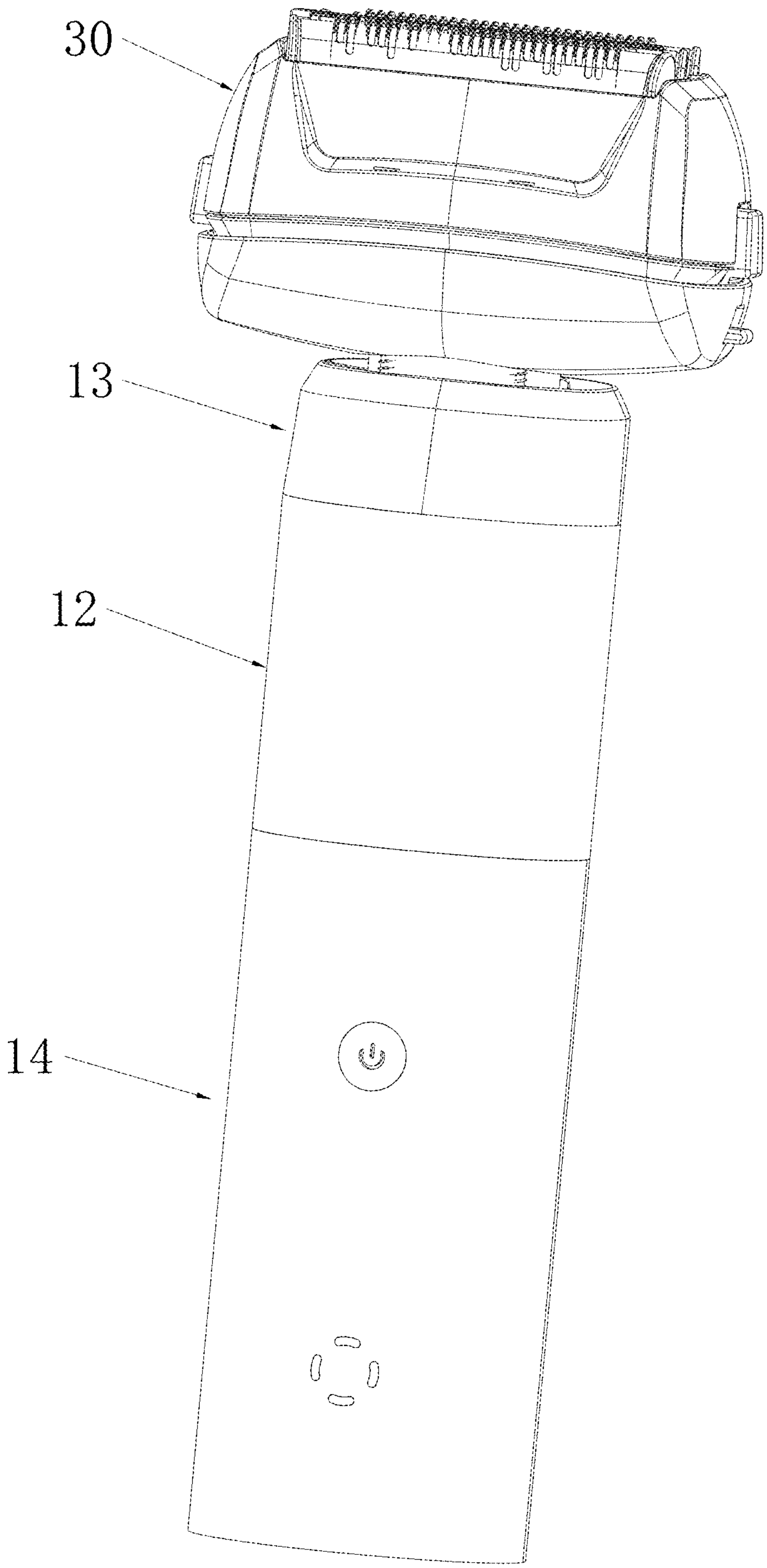
FIG. 12 is a perspective schematic structural diagram of an electric hair clipper according to a fourth implementation of the disclosure.
Figure 13:
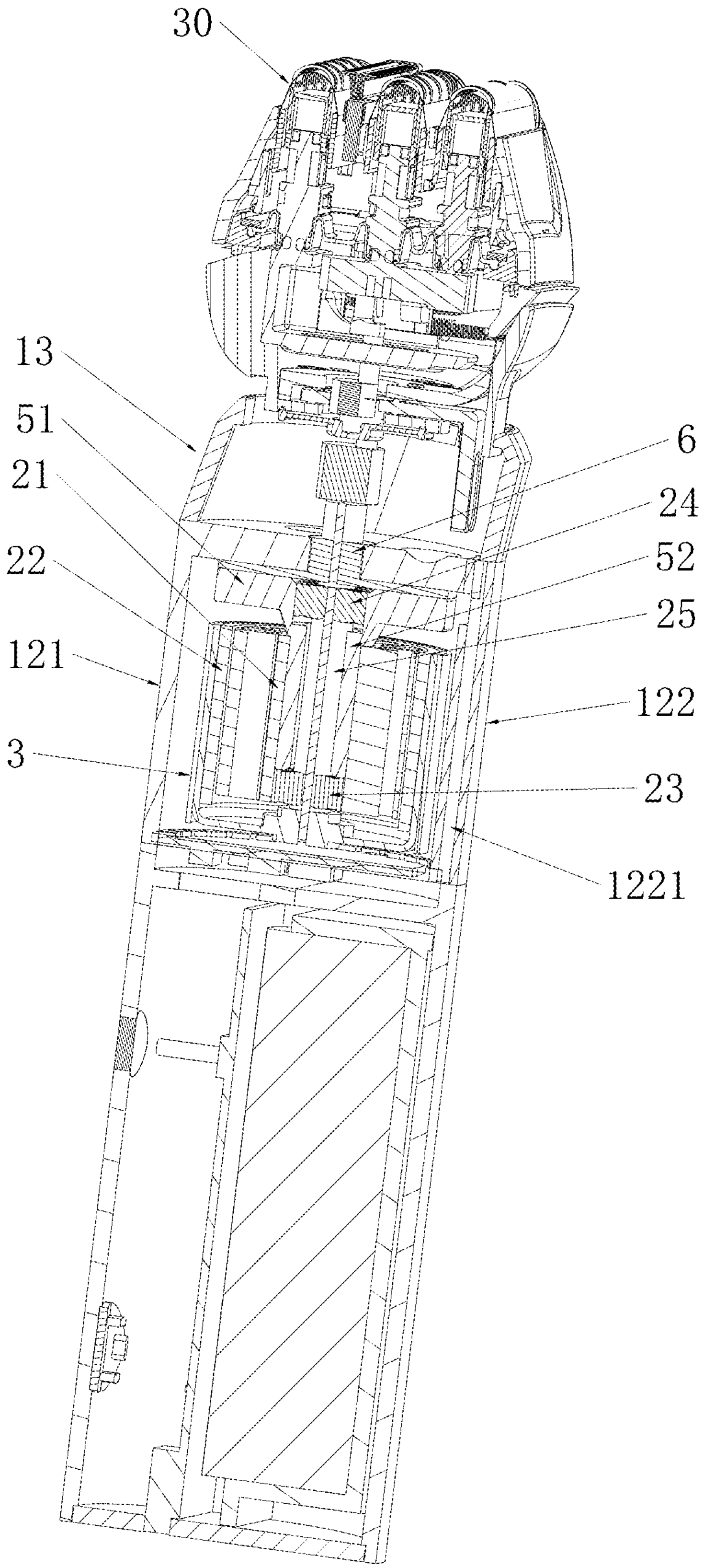
FIG. 13 is a cross-sectional view of the electric hair clipper shown in FIG. 12.

Referring to FIGS. 8-9, for ease of mounting, in an implementation, the housing 1 may further include:

a front housing 13 made of a non-transparent material;

a rear housing 14 made of a non-transparent material; and the observation portion 12 sandwiched between the front housing 13 and the rear housing 14, where the inner cavity 11 is enclosed by the observation portion 12, the front housing 13 and the rear housing 14, and the observation portion 12 is disposed around the outer rotor motor 2, that is, the observation portion 12 is of a ring structure, which can increase a visual range and is more convenient for the user to view the pattern layer 3.

Referring to FIGS. 8-9, in an implementation, the front housing 13 includes:

an upper front housing 131; and a lower front housing 132, where one of the lower front housing 132 and the upper front housing 131 is provided with a first snap-in groove 1321, the other one of the lower front housing 132 and the upper front housing 131 is provided with a first snap-in protrusion 1311, and the first snap-in protrusion 1311 is mated with the first snap-in groove 1321 to connect the lower front housing 132 and the upper front housing 131 together, such that the lower front housing 132 and the upper front housing 131 can be mounted without tools, the mounting operation is simpler and more convenient, and the mounting efficiency can be improved; and the rear housing 14 includes:

an upper rear housing 141;

a lower rear housing 142, where one of the lower rear housing 142 and the upper rear housing 141 is provided with a second snap-in groove 1421, the other one of the lower rear housing 142 and the upper rear housing 141 is provided with a second snap-in protrusion 1411, and the second snap-in protrusion 1411 is mated with the second snap-in groove 1421 to connect the lower rear housing 142 and the upper rear housing 141 together, such that the lower rear housing 142 and the upper rear housing 141 can be mounted without tools, the mounting operation is simpler and more convenient, and the mounting efficiency can be improved; and an end cover 143 covering rear end openings of both the upper rear housing 141 and the lower rear housing 142, where the end cover 143 is provided with a third snap-in groove 1431, at least one of the upper rear housing 141 and the lower rear housing 142 is provided with a third snap-in protrusion 1412, and the third snap-in protrusion 1412 is mated with the third snap-in groove 1431, such that the end cover 143, the upper rear housing 141 and the lower rear housing 142 can be mounted without tools, and the mounting operation is simpler and more convenient.

In an implementation, the upper rear housing 141 and the lower rear housing 142 both are provided with the third snap-in protrusions 1412, and each of the third snap-in protrusions 1412 is inserted into a corresponding third snap-in groove 1431, so as to reliably connect the end cover 143 and the upper rear housing 141 as well as the end cover 143 and the lower rear housing 142 together.

In an implementation, the end cover 143, the upper rear housing 141 and the lower rear housing 142 are also connected together via a second fastener to improve the connection stability of the end cover 143, the upper rear housing 141 and the lower rear housing 142, thereby ensuring that the end cover 143, the upper rear housing 141 and the lower rear housing 142 are reliably fixed together.

In an implementation, the second fastener may be a screw, or a fastening structure such as a rivet, a bolt, or the like.

In an implementation, the observation portion 12 is provided with an observation port, which is in communication with the inner cavity 11 and directly faces the outer rotor 22, such that the user can visually observe the pattern layer 3 as well.

Referring to FIGS. 10-14, in an implementation, the electric hair clipper further includes:

a functional head 30 that is connected to an output end 252 of the outer rotor motor 2 and configured for haircutting or shaving, such that the electric hair clipper can be configured for both haircutting and shaving, is thus more diversified in function, and can meet different use requirements of the user.

In an implementation, the observation portion 12 is made of a transparent material, disposed around the outer rotor 22, and provided with a routing cavity 1221; and the routing cavity 1221 extends along a length direction of the housing 1, is in communication with the inner cavity 11, and is configured for a power supply line of the functional head 30 to run through, such that an electric wire of the functional head 30 can be stored and positioned by using the routing cavity 1221, so that the power supply line of the functional head 30 is arranged regularly and neatly, causing an internal structure of the observation portion 12 to be more concise, and thus improving the aesthetic degree of the electric hair clipper.

Figure 14:
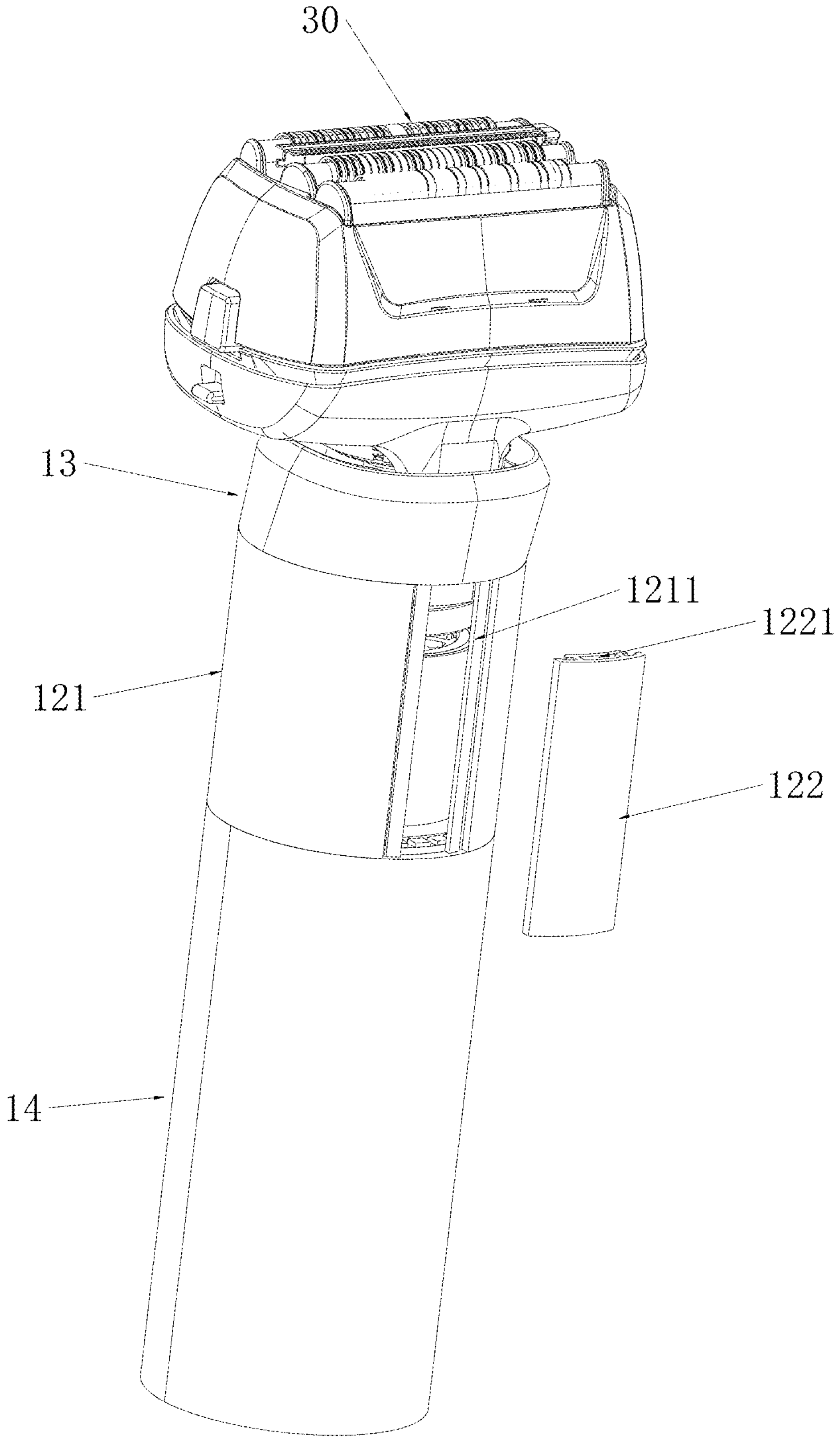
FIG. 14 is an exploded view of the electric hair clipper shown in FIG. 12.

In order to reduce the processing difficulty of the observation portion 12 and reduce the wiring difficulty, referring to FIG. 14, in an implementation, the observation portion 12 includes:

a first base 121 made of a transparent material and disposed around the outer rotor 22, where a mounting groove 1211 is provided in an outer peripheral wall of the first base 121, and is in communication with the inner cavity 11; and a second base 122 provided in the mounting groove 1211 and covering a side opening of the mounting groove 1211, where the routing cavity 1221 is provided on the second base 122, the second base 122 and the first base 121 are disposed separately, and the second base 122 is made of a transparent material.

Referring to FIGS. 2, 6, 7 and 9, in an implementation, the electric hair clipper further includes:

a fixation frame 4 disposed in the inner cavity 11, where the fixation frame 4 is connected to the housing 1 and the outer rotor motor 2, so as to connect the outer rotor motor 2 and the housing 1 together; and a shock-absorbing body 5 disposed between the outer rotor motor 2 and the fixation frame 4, such that vibrations generated when the outer rotor motor 2 operates can be absorbed and buffered by using the shock-absorbing body 5, so as to reduce the vibrations transferred to the housing 1, thereby achieving a good shock-absorbing effect.

Figure 2:
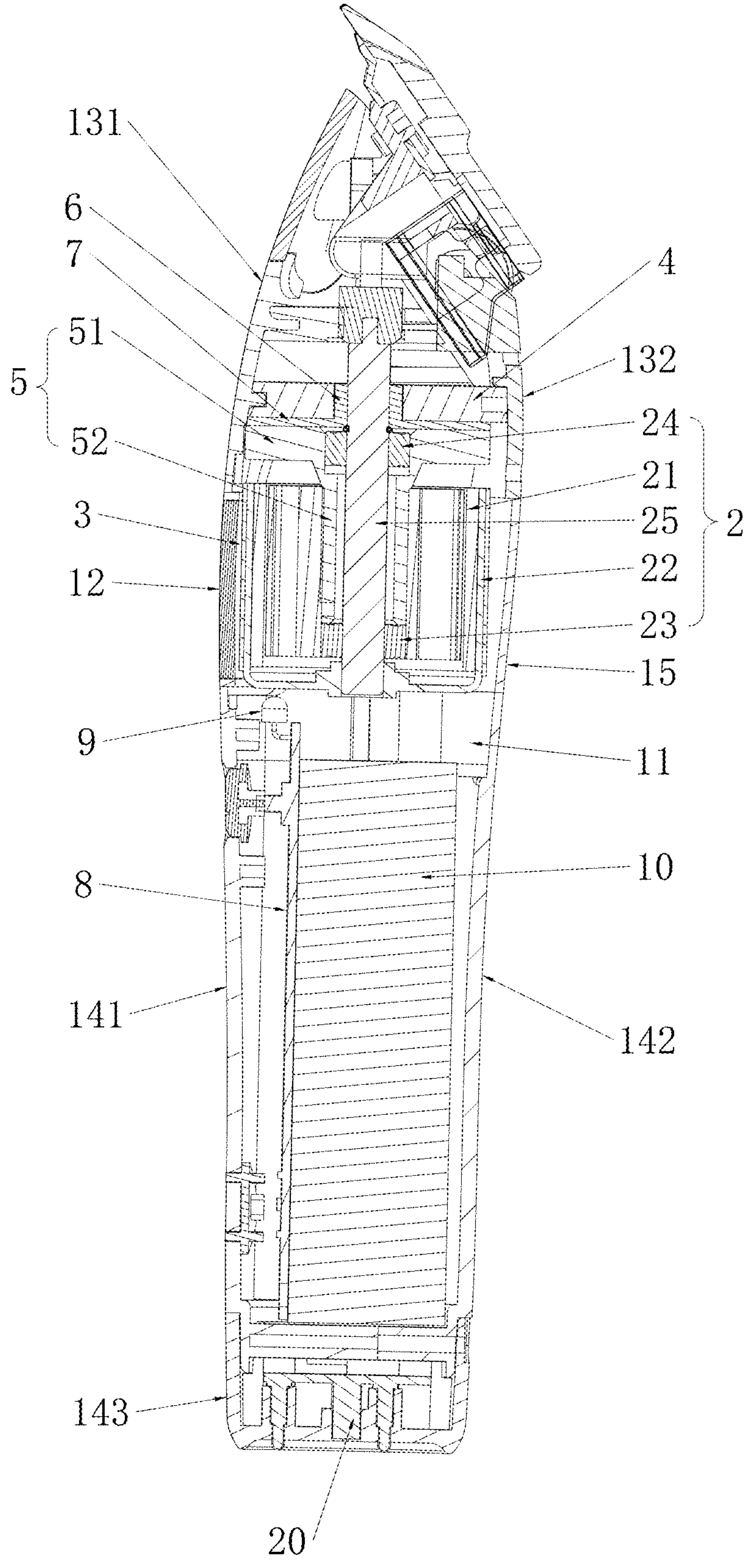
FIG. 2 is a cross-sectional view of the electric hair clipper shown in FIG. 1.
Figure 3:
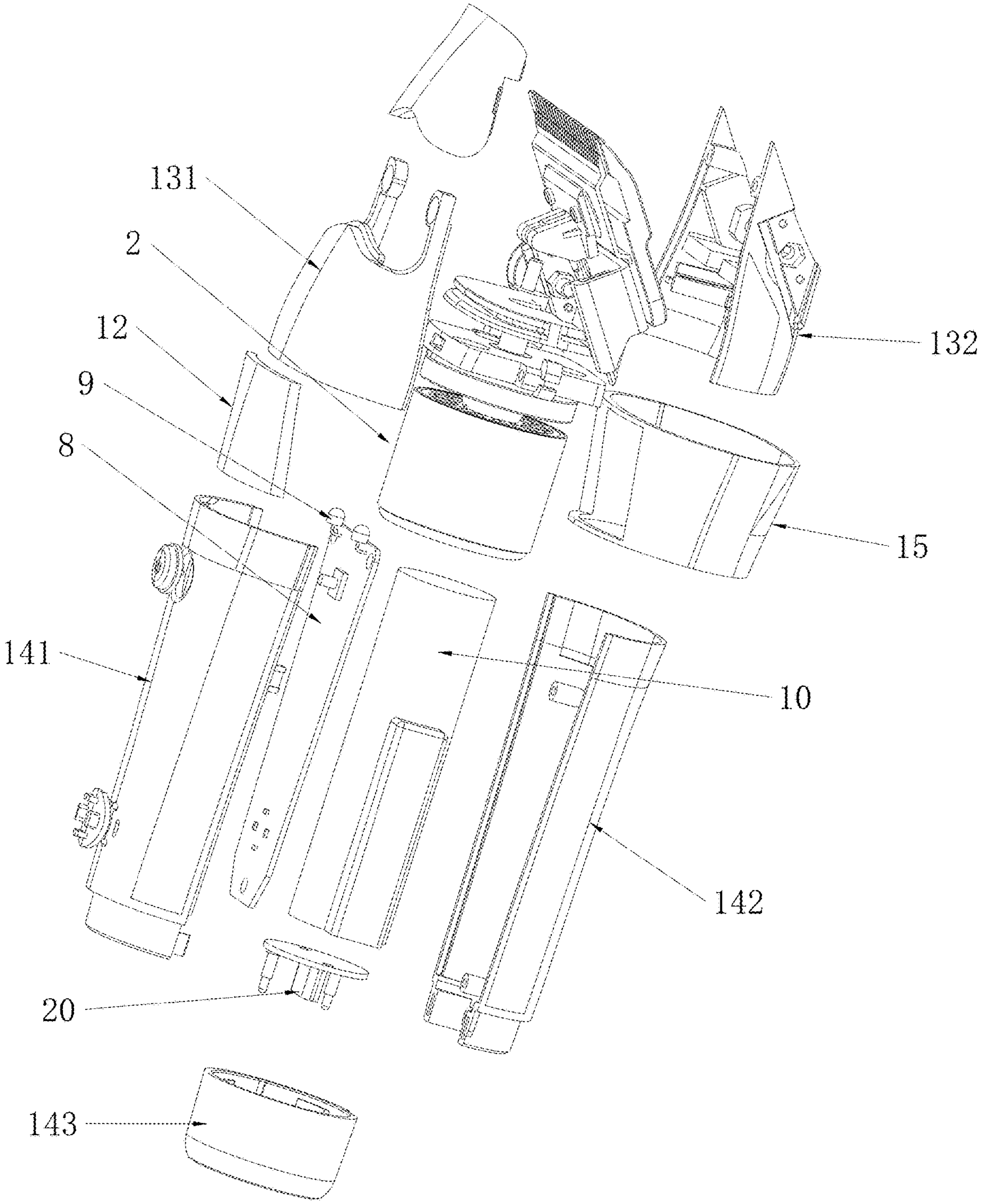
FIG. 3 is an exploded view of the electric hair clipper shown in FIG. 1.
Figure 4:
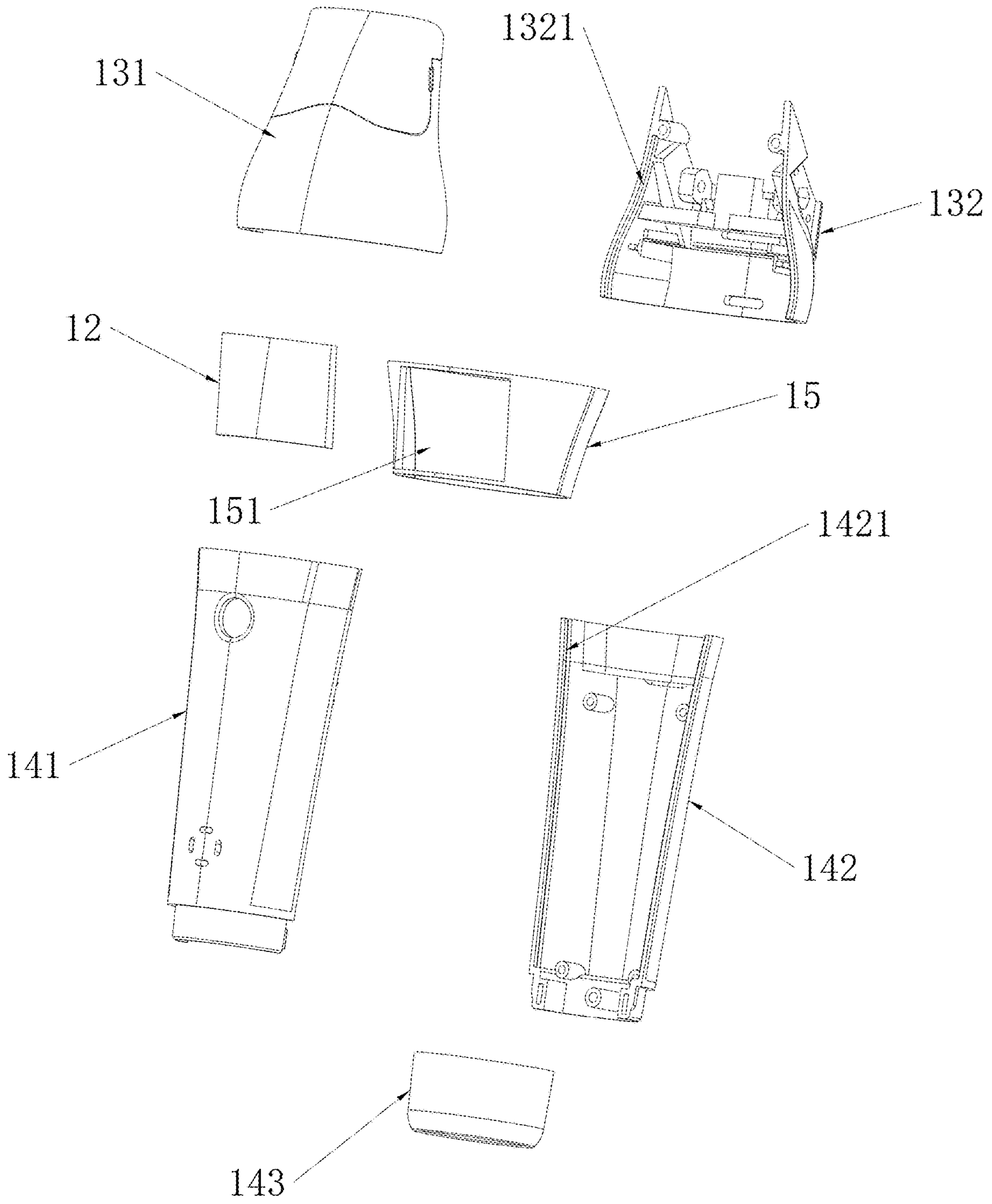
FIG. 4 is an exploded view of a housing in the electric hair clipper shown in FIG. 1 from a first perspective.
Figure 7:
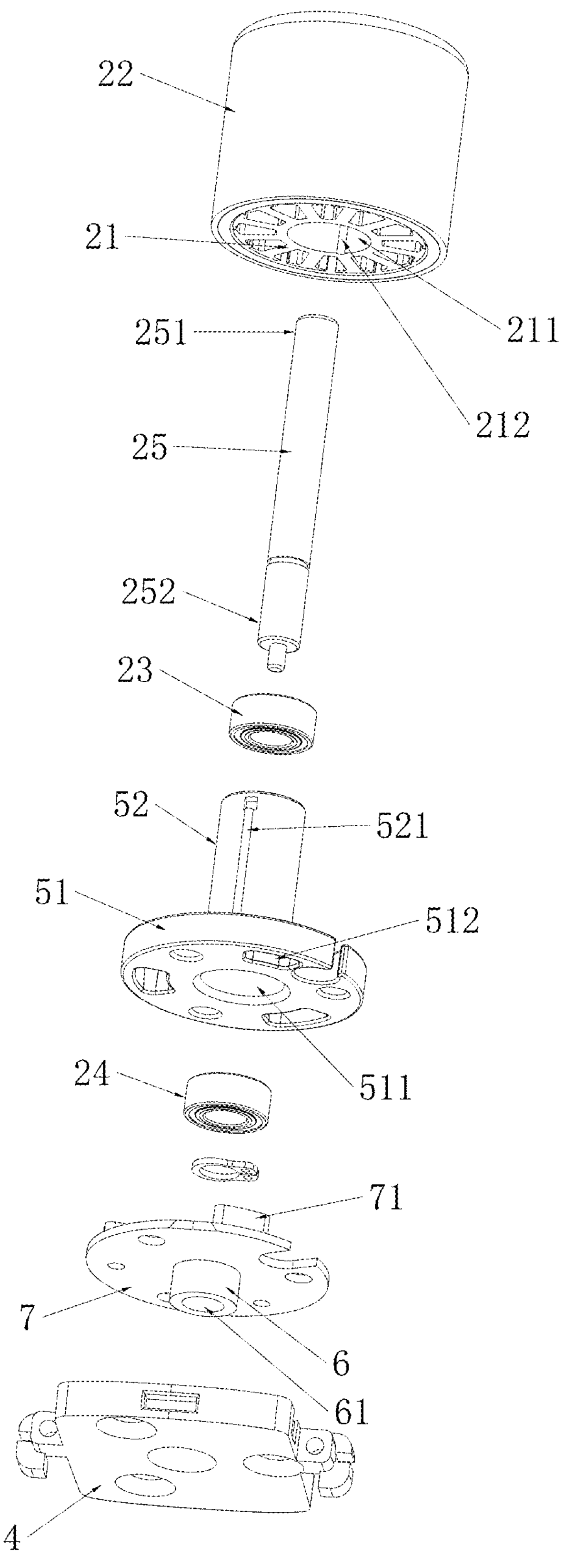
FIG. 7 is an exploded view of the motor, the fixation frame, and the shock-absorbing body shown in FIG. 6.

For ease of mounting, referring to FIGS. 2, 7 and 8, in an implementation, the shock-absorbing body 5 is provided with a first shock-absorbing portion 51 and a second shock-absorbing portion 52 that are arranged in sequence along a length direction of the shock-absorbing body 5, where the first shock-absorbing portion 51 is connected to the fixation frame 4 to connect the shock-absorbing body 5 and the fixation frame 4 together, and the first shock-absorbing portion 51 is provided with a first mounting hole 511; and the outer rotor motor 2 includes:

an inner stator 21 provided with a second mounting hole 211, where the second shock-absorbing portion 52 is inserted into the second mounting hole 211 to connect the shock-absorbing body 5 and the outer rotor motor 2 together;

the outer rotor 22 connected to the inner stator 21;

a first bearing 23 disposed in the second mounting hole 211;

a second bearing 24 disposed in the first mounting hole 511; and an output shaft 25, where an input end 251 of the output shaft 25 runs through a center hole of the first bearing 23 and is connected to the outer rotor 22, an output end 252 of the output shaft 25 runs through a center hole of the second bearing 24 and the fixation frame 4, and an inner ring of the first bearing 23 and an inner ring of the second bearing 24 are both rotatable with the output shaft 25, such that the first bearing 23 and the second bearing 24 are used to support and limit the output shaft 25, thereby reducing the swing of the output shaft 25 to cause the rotation of the output shaft 25 to be more stable, and facilitating improvement of the transmission efficiency of the output shaft 25.

Referring to FIG. 7, in an implementation, one of the second shock-absorbing portion 52 and the second mounting hole 211 is provided with a fourth snap-in groove 212, the other one of the second shock-absorbing portion 52 and the second mounting hole 211 is provided with a fourth snap-in protrusion 521, and the fourth snap-in protrusion 521 is inserted into the fourth snap-in groove 212 to connect the shock-absorbing body 5 and the outer rotor motor 2 together, such that while the connection reliability of the shock-absorbing body 5 and the outer rotor motor 2 is improved, the shock-absorbing body 5 and the outer rotor motor 2 can be mounted without tools, and therefore, the mounting operation is simpler and more convenient, and the mounting efficiency can be improved.

Referring to FIGS. 2, 7 and 9, in an implementation, the electric hair clipper further includes:

a wear bushing 6 provided on the fixation frame 4, where the wear bushing 6 is provided with a penetrating hole 61, and the penetrating hole 61 is configured for the output end 252 of the output shaft 25 to run through, such that the fixation frame 4 can be prevented from wearing due to the rotation of the output shaft 25, thereby achieving an effect of protecting the fixation frame 4.

Referring to FIGS. 2, 7 and 9, in an implementation, the electric hair clipper further includes:

a gasket 7 sandwiched between the first shock-absorbing portion 51 and the fixation frame 4, where the gasket 7 is disposed to facilitate improvement of a fitting degree between the first shock-absorbing portion 51 and the fixation frame 4, such that the first shock-absorbing portion 51 and the fixation frame 4 can be connected together more reliably, and the separation between the first shock-absorbing portion 51 and the fixation frame 4 can be effectively limited, thereby achieving higher structural reliability.

Referring to FIG. 7, in an implementation, one of the gasket 7 and the first shock-absorbing portion 51 is provided with a positioning groove 512, the other one of the gasket 7 and the first shock-absorbing portion 51 is provided with a positioning protrusion 71, and the positioning protrusion 71 is inserted into the positioning groove 512 for mounting and positioning the gasket 7, such that the gasket 7 is rapidly sandwiched between the first shock-absorbing portion 51 and the fixation frame 4.

In an implementation, a plurality of positioning grooves 512 and a plurality of positioning protrusions 71 are provided, and the positioning protrusions 71 are correspondingly inserted into the corresponding positioning grooves 512 on a one-to-one basis.

In an implementation, the fixation frame 4, the gasket 7 and the first shock-absorbing portion 51 are connected together via a first fastener (not shown), such that the fixation frame 4, the gasket 7 and the first shock-absorbing portion 51 are reliably fixed together.

For ease of mounting, in an implementation, a head of the first fastener abuts against a side of the fixation frame 4 away from the gasket 7, and a rod portion of the first fastener runs through the fixation frame 4 and the gasket 7, and is in threaded connection with the first shock-absorbing portion 51.

In an implementation, the first fastener may be a screw, or a fastening structure such as a rivet, a bolt, or the like.

In an implementation, the shock-absorbing body 5 is of a structure that is made of a silicone material, so as to improve the shock-absorbing performance of the shock-absorbing body 5.

Of course, in other implementations, the shock-absorbing body 5 may be of a structure that is made of a rubber material, or of a structure that is made of other materials having a shock-absorbing effect.

In an implementation, the gasket 7 and the wear bushing 6 are integrally disposed, such that since the gasket 7 is sandwiched between the first shock-absorbing portion 51 and the fixation frame 4, the wear bushing 6 may be axially limited by the gasket 7, so as to limit the separation of the wear bushing 6 from the fixation frame 4, thereby ensuring that the wear bushing 6 can be reliably fixed on the fixation frame 4, and the structure is simple and practical.

Of course, in other implementations, the gasket 7 and the wear bushing 6 may also be disposed separately, that is, the gasket 7 and the wear bushing 6 both are of structures that are independently disposed.

Referring to FIGS. 2 and 9, in an implementation, the electric hair clipper further includes:

a circuit board 8 disposed in the inner cavity 11, where the circuit board 8 is electrically connected to the outer rotor motor 2, and is configured to control on and off of the outer rotor motor 2; and an LED lamp 9 disposed in the inner cavity 11 and electrically connected to the circuit board 8, where the circuit board 8 is further configured to control on and off of the LED lamp 9, and the LED lamp 9 is disposed toward the outer rotor motor 2, and is configured to increase brightness of a position where the pattern layer 3 is located, thereby ensuring that the user can visually observe the pattern layer 3.

In an implementation, the LED lamp 9 may specifically be directly electrically connected to the circuit board 8, and a lamp board may also be added, where the lamp board is electrically connected to the circuit board 8, and may specifically be disposed in the middle housing or the observation portion that is disposed around the outer rotor, and the LED lamp 9 is electrically connected to the circuit board 8.

In an implementation, there are two LED lamps 9 that are disposed on left and right sides of the outer rotor motor 2 respectively, such that the brightness of the position where the pattern layer 3 is located can be further improved when the two LED lamps 9 are turned on.

Of course, in other implementations, the number of the LED lamps 9 may be one, or three or more.

Referring to FIGS. 2 and 9, in an implementation, the electric hair clipper further includes:

a battery 10 disposed in the inner cavity 11, where the battery 10 is electrically connected to the circuit board 8 to supply power to the circuit board 8, such that during use, the electric hair clipper can be connected to an external power supply without using a power supply line, facilitating improvement of use convenience of the electric hair clipper.

Referring to FIGS. 2 and 9, in an implementation, the electric hair clipper further includes:

a charging port 20 electrically connected to the battery 10, that is, the battery 10 is a rechargeable battery 10, and may be charged by electrically connecting the charging port 20 to the power supply line of the external power supply, such that the battery 10 can be used circularly, and at the same time, it can ensure that the electric hair clipper is adequately powered.

Of course, in other implementations, the electric hair clipper may be not provided with the battery 10, and the battery 10 described above may also be a disposable battery 10.

Referring to FIGS. 2 and 9, in an implementation, the circuit board 8 and the outer rotor motor 2 are disposed in sequence along the length direction of the housing 1, and the battery 10 and the circuit board 8 are disposed in sequence along a width direction of the housing 1, such that the circuit board 8, the outer rotor motor 2 and the battery 10 are arranged more regularly and neatly to increase the space utilization of the housing 1 in the length direction and the width direction, thereby causing the electric hair clipper to be more compact in structure and better facilitating a miniaturization design of the electric hair clipper.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the disclosure. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are merely used for the purpose of illustration, and cannot be construed as indicating or implying relative importance or implicitly indicating the number of technical features indicated. Thus, the features defined with "first" and "second" may explicitly or implicitly include at least one of the features. In the description of the disclosure, the meaning of "a plurality of" is two or more, unless explicitly and specifically defined otherwise.

The above descriptions are merely specific implementations of the disclosure, but are not intended to limit the scope of protection of the disclosure. Any variation or replacement readily figured out by those skilled in the art within the technical scope disclosed in the disclosure shall fall within the scope of protection of the disclosure. Therefore, the scope of protection of the disclosure shall be subject to the scope of protection of the claims.

What is claimed:

1. An electric hair clipper, comprising:
- a housing provided with an inner cavity:
- an outer rotor motor disposed in the inner cavity; and
- a pattern layer that is disposed on an outer rotor of the outer rotor motor, and is rotatable with the outer rotor,
- wherein the housing is provided with an observation portion that is configured for a user to visually observe the pattern layer from outside the housing;
- a functional head connected to an output end of the outer rotor motor and configured for haircutting or shaving.

2. The electric hair clipper according to claim 1, wherein the pattern layer is printed on an outer surface of the outer rotor, or the pattern layer is adhered on the outer surface of the outer rotor.

3. The electric hair clipper according to claim 1, wherein the observation portion is made of a transparent material.

4. The electric hair clipper according to claim 3, wherein the housing comprises:
- a front housing made of a non-transparent material;
- a rear housing made of a non-transparent material; and
- a middle housing sandwiched between the front housing and the rear housing, wherein the inner cavity is enclosed by the middle housing, the front housing and the rear housing, the middle housing is disposed around the outer rotor and provided with a view window that is covered by the observation portion, and the middle housing is made of a non-transparent material.

5. The electric hair clipper according to claim 4, wherein the front housing comprises:
- an upper front housing; and
- a lower front housing, wherein one of the lower front housing and the upper front housing is provided with a first snap-in groove, the other of the lower front housing and the upper front housing is provided with a first snap-in protrusion, and the first snap-in protrusion is mated with the first snap-in groove to connect the lower front housing and the upper front housing together; and the rear housing comprises:
- an upper rear housing;
- a lower rear housing, wherein one of the lower rear housing and the upper rear housing is provided with a second snap-in groove, the other of the lower rear housing and the upper rear housing is provided with a second snap-in protrusion, and the second snap-in protrusion is mated with the second snap-in groove to connect the lower rear housing and the upper rear housing together; and
- an end cover covering rear end openings of both the upper rear housing and the lower rear housing, wherein the end cover is provided with a third snap-in groove, at least one of the upper rear housing and the lower rear housing is provided with a third snap-in protrusion, and the third snap-in protrusion is mated with the third snap-in groove.

6. The electric hair clipper according to claim 3, wherein the housing comprises:
- a front housing made of a non-transparent material;
- a rear housing made of a non-transparent material; and
- the observation portion sandwiched between the front housing and the rear housing, wherein the inner cavity is enclosed by the observation portion, the front housing and the rear housing, and the observation portion is disposed around the outer rotor.

7. The electric hair clipper according to claim 6, wherein the front housing comprises:
- an upper front housing; and
- a lower front housing, wherein one of the lower front housing and the upper front housing is provided with a first snap-in groove, the other of the lower front housing and the upper front housing is provided with a first snap-in protrusion, and the first snap-in protrusion is mated with the first snap-in groove to connect the lower front housing and the upper front housing together; and the rear housing comprises:
- an upper rear housing;
- a lower rear housing, wherein one of the lower rear housing and the upper rear housing is provided with a second snap-in groove, the other of the lower rear housing and the upper rear housing is provided with a second snap-in protrusion, and the second snap-in protrusion is mated with the second snap-in groove to connect the lower rear housing and the upper rear housing together; and
- an end cover covering rear end openings of both the upper rear housing and the lower rear housing, wherein the end cover is provided with a third snap-in groove, at least one of the upper rear housing and the lower rear housing is provided with a third snap-in protrusion, and the third snap-in protrusion is mated with the third snap-in groove.

8. The electric hair clipper according to claim 7, further comprising:
- a fixation frame disposed in the inner cavity, wherein the fixation frame is connected to the housing and the outer rotor motor, so as to connect the outer rotor motor and the housing together; and
- a shock-absorbing body disposed between the outer rotor motor and the fixation frame.

9. The electric hair clipper according to claim 8, wherein the shock-absorbing body is provided with a first shock-absorbing portion and a second shock-absorbing portion, the first shock-absorbing portion and the second shock-absorbing portion are disposed in sequence along a length direction of the shock-absorbing body, and the first shock-absorbing portion is connected to the fixation frame and provided with a first mounting hole; and the outer rotor motor comprises:
- an inner stator provided with a second mounting hole, wherein the second shock-absorbing portion is inserted into the second mounting hole;
- the outer rotor connected to the inner stator;
- a first bearing disposed in the second mounting hole;
- a second bearing disposed in the first mounting hole; and
- an output shaft, wherein an input end of the output shaft runs through a center hole of the first bearing and is connected to the outer rotor, an output end of the output shaft runs through a center hole of the second bearing and the fixation frame, and an inner ring of the first bearing and an inner ring of the second bearing are both rotatable with the output shaft.

10. The electric hair clipper according to claim 9, wherein one of the second shock-absorbing portion and the second mounting hole is provided with a fourth snap-in groove, the other of the second shock-absorbing portion and the second mounting hole is provided with a fourth snap-in protrusion, and the fourth snap-in protrusion is inserted into the fourth snap-in groove to connect the shock-absorbing body and the outer rotor motor together.

11. The electric hair clipper according to claim 9, further comprising:

a wear bushing provided on the fixation frame, wherein the wear bushing is provided with a penetrating hole, and the penetrating hole is configured for the output end of the output shaft to run through.

12. The electric hair clipper according to claim 11, further comprising:

a gasket sandwiched between the first shock-absorbing portion and the fixation frame.

13. The electric hair clipper according to claim 12, wherein one of the gasket and the first shock-absorbing portion is provided with a positioning groove, and the other of the gasket and the first shock-absorbing portion is provided with a positioning protrusion that is inserted into the positioning groove.

14. The electric hair clipper according to claim 1, wherein the observation portion is made of a transparent material, the observation portion is disposed around the outer rotor and provided with a routing cavity, and the routing cavity extends along a length direction of the housing, is in communication with the inner cavity, and is configured to allow a power supply line of the functional head to run through.

15. The electric hair clipper according to claim 14, wherein the observation portion comprises:

a first base made of a transparent material and disposed around the outer rotor, wherein a mounting groove is provided in an outer peripheral wall of the first base, and is in communication with the inner cavity; and a second base provided in the mounting groove and covering a side opening of the mounting groove, wherein the routing cavity is provided on the second base, the second base and the first base are disposed separately, and the second base is made of a transparent material.

16. The electric hair clipper according to claim 1, further comprising:

a circuit board disposed in the inner cavity, wherein the circuit board is electrically connected to the outer rotor motor, and is configured to control on and off of the outer rotor motor; and an LED lamp disposed in the inner cavity and electrically connected to the circuit board, wherein the circuit board is further configured to control on and off of the LED lamp, and the LED lamp is disposed toward the outer rotor motor, and is configured to increase brightness of a position where the pattern layer is located.

17. The electric hair clipper according to claim 16, further comprising:

a battery disposed in the inner cavity and electrically connected to the circuit board.

18. The electric hair clipper according to claim 17, further comprising:

a charging port electrically connected to the battery.

* * * * *